US011438439B1

(12) United States Patent
Andrew et al.

(10) Patent No.: US 11,438,439 B1
(45) Date of Patent: Sep. 6, 2022

(54) DETECTING NON-PERSONAL NETWORK AND CONNECTIVITY ATTRIBUTES FOR CLASSIFYING USER LOCATION

(71) Applicant: Microsoft Technology Licensing, LLC, Redmond, WA (US)

(72) Inventors: Paul James Andrew, Redmond, WA (US); Chittaranjan Sadanand Pattekar, Redmond, WA (US); Konstantin Ryvkin, Bellevue, WA (US); Srinivasachakrapani Kotipalli, Sammamish, WA (US); Michael Andres Carrillo Pinzon, Redmond, WA (US); Bryan Louis Porter, St. Charles, MO (US); Vijay Mohan Ankireddi, Bothell, WA (US); Shayon Gupta, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/219,211

(22) Filed: Mar. 31, 2021

(51) Int. Cl.
*H04L 67/52* (2022.01)
*G06F 16/28* (2019.01)
*H04L 61/103* (2022.01)
*H04L 61/4511* (2022.01)
*H04L 61/5007* (2022.01)
*H04L 61/58* (2022.01)
*H04L 101/668* (2022.01)

(52) U.S. Cl.
CPC .......... *H04L 67/52* (2022.05); *G06F 16/285* (2019.01); *H04L 61/103* (2013.01); *H04L 61/4511* (2022.05); *H04L 61/5007* (2022.05); *H04L 61/58* (2022.05); *H04L 2101/668* (2022.05)

(58) Field of Classification Search
CPC ............. H04L 61/103; H04L 61/1511; H04L 61/2007; H04L 61/2009; H04L 61/6068; H04L 67/18; G06F 16/285
USPC ........................................................ 709/245
See application file for complete search history.

(56) References Cited

U.S. PATENT DOCUMENTS

| 7,509,406 B2 * | 3/2009 | Abdo ................ G06F 21/105 709/223 |
| 7,647,625 B2 * | 1/2010 | Grinstein ............ H04L 63/101 726/4 |
| 9,130,925 B2 * | 9/2015 | Homer ................ G06F 21/31 |
| 9,680,964 B2 * | 6/2017 | Shukla ................ H04L 67/34 |

(Continued)

FOREIGN PATENT DOCUMENTS

| EP | 3113013 A1 | 1/2017 |
| WO | 2011145855 A2 | 11/2011 |

OTHER PUBLICATIONS

"International Search Report and Written Opinion Issued in PCT Application No. PCT/US22/020285", dated Jun. 17, 2022, 12 Pages.

*Primary Examiner* — David P Zarka
(74) *Attorney, Agent, or Firm* — Christopher J. Volkmann; Kelly, Holt & Christenson, PLLC

(57) ABSTRACT

Non-personal network attributes of a user's network connection are detected. A user's physical location is classified as being onsite or remote based upon the non-personal network attributes. Connectivity performance information is generated indicative of a performance of a user device in connecting with the host computing system over the network, and a control signal is generated to surface performance information through an administrative system.

19 Claims, 11 Drawing Sheets

(56) References Cited

U.S. PATENT DOCUMENTS

| | | | |
|---|---|---|---|
| 10,554,622 B2* | 2/2020 | Budhani | H04L 63/0815 |
| 10,728,117 B1 | 7/2020 | Sharma et al. | |
| 10,798,151 B2* | 10/2020 | Kirby | H04L 67/34 |
| 10,915,383 B2* | 2/2021 | Steuer | G06F 9/452 |
| 11,061,667 B1* | 7/2021 | Gujarathi | H04L 67/10 |
| 2014/0129616 A1* | 5/2014 | Lerios | H04W 4/021 |
| | | | 709/203 |
| 2020/0014697 A1* | 1/2020 | Karin | G06N 20/00 |
| 2021/0176061 A1* | 6/2021 | Ayyadevara | H04L 9/14 |

* cited by examiner

DETECTING NON-PERSONAL NETWORK AND CONNECTIVITY ATTRIBUTES FOR CLASSIFYING USER LOCATION

BACKGROUND

Computing systems are currently in wide use. Some computing systems host services or applications for use by users of those services and applications. The users may be individual users, or users belonging to an organization (such as a tenant, e.g., company or other organization).

Users who are members of an organization may be onsite users. Onsite users are users that are physically located at the physical facilities of the organization and thus use the physical machines and infrastructure of the organization for connection to the hosted services and applications. The organization users may also be remote users, such as users who are working from home or from another location that is remote from the physical facility of the organization. The remote users thus use machines and infrastructure other than those physically located at the organization, for connection to the hosted services and applications. For instance, remote users may use the physical machines and infrastructure located at their home when they are working remotely from home.

Some host computing systems also provide an administrative center which allows system administrators to view performance data collected for their own systems. The performance data may include connectivity data which indicates how well the administrator's system is performing with respect to connectivity issues. The administrative center may also provide recommendations for improving connectivity performance and other performance issues.

The discussion above is merely provided for general background information and is not intended to be used as an aid in determining the scope of the claimed subject matter.

SUMMARY

Non-personal network attributes of a user's network connection are detected. A user's physical location is classified as being onsite or remote based upon the non-personal network attributes, and control signals are generated to send the user classification to other systems.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
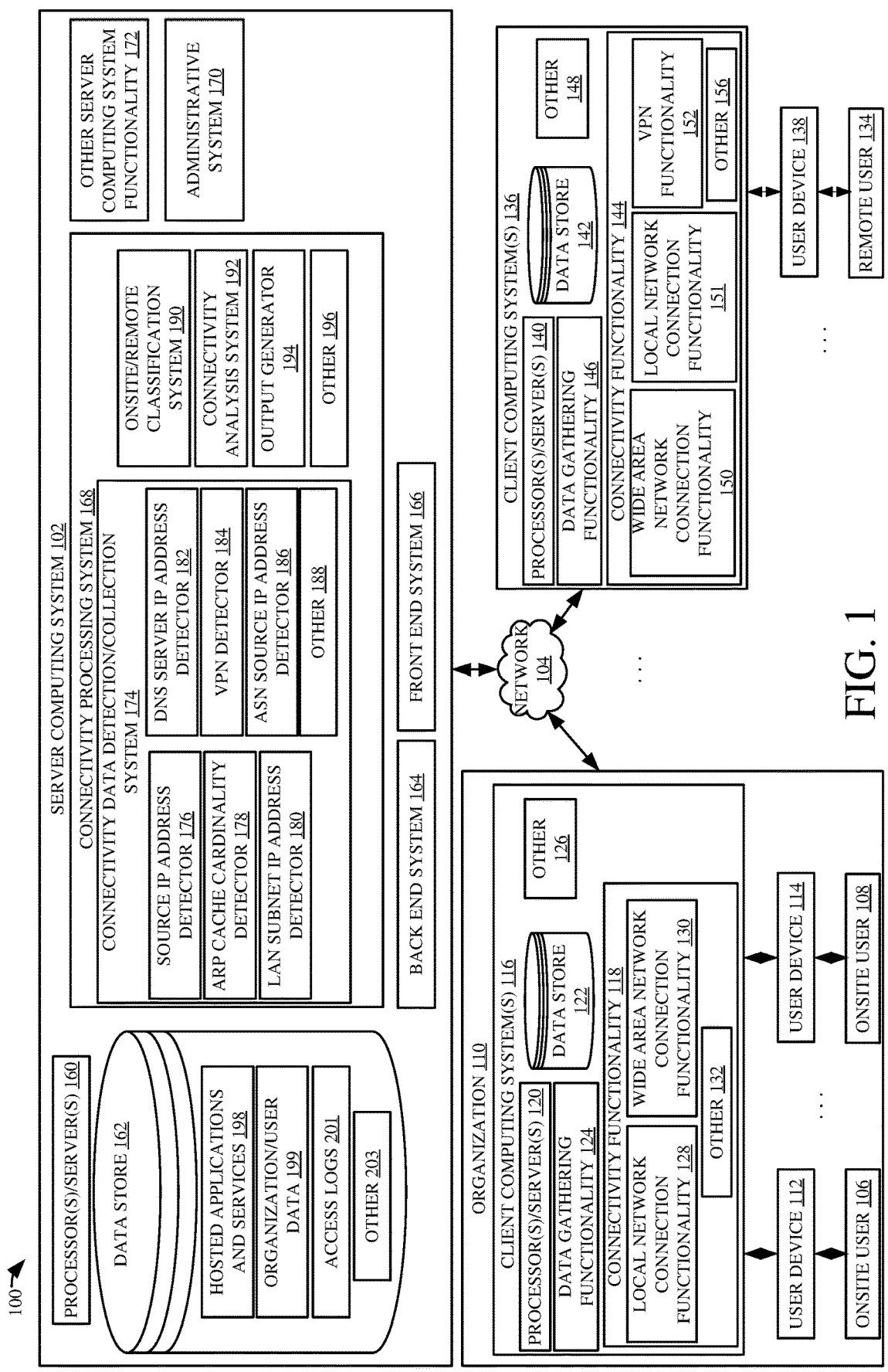
FIG. 1 is a block diagram of one example of a computing system architecture.

As discussed above, users can connect to a wide area network (such as the Internet) to access hosted services and applications using different types of physical machines and other connectivity resources and infrastructure. For instance, where the user is physically located at a business, the user is often connecting to the wide area network through the physical machines (e.g., routers, gateways, etc.) and other connectivity resources and infrastructure that is physically located on the premises of the business or organization. However, today users are increasingly working remotely, meaning that they are at a physical location that is remote relative to the business or organization. When a user is working remotely, the user's networking machines and other connectivity resources and infrastructure are often quite different from those when the user is working onsite (e.g., at the physical location of the business or organization). When the user is working remotely, the user is often using the physical machines (e.g., a router, gateway, etc.) and other connectivity resources and infrastructure that is located at the remote location, such as at the user's home. It may be that the user is also connecting to the wide area network at a shared worksite, such as a coffee shop, or hotel, etc. In that case, the user is using the physical machines and other connectivity resources and infrastructure at the shared worksite.

Also, as discussed above, it is not uncommon for a hosted service or application to allow an administrator to access performance data through an administrative system. In one example, the administrative system can collect connectivity and other performance data from the client computing systems that the user is using to access the hosted services and applications. The administrative system can also obtain connectivity and other performance data from the host or server side. Such connectivity and performance data can include such things as download speeds, latency from a client computing system to a hosted computing system and vice versa, page load times, comparative information indicating whether other similarly situated users are experiencing better or worse connectivity performance, and a wide variety of other performance metrics, statistics, comparison results, etc. The administrative system can also provide suggestions or recommendations as to how to reconfigure or change settings, equipment, and other resources in order to improve connectivity performance.

However, the analysis of the various connectivity and performance data collected, and the suggestions to improve connectivity performance, will vary greatly based upon the physical machines and other connectivity resources and connectivity infrastructure that a particular user is using in order to connect to the hosted services and applications. In order to determine the type of physical machines and other connectivity resources and infrastructure that a user is using to connect to the hosted service or applications, it can be helpful to identify the physical location of the user. However, this may be undesirable due to privacy concerns. Therefore, it can be helpful to determine whether the user is an onsite user, in which case the user is connecting to the hosted services and applications through the physical machines and other connectivity resources and infrastructure at the physical location of a company, or whether the user is a remote user, in which case the user is connecting to the hosted services and applications using the physical machines and other connectivity resources and infrastructure at a location other than the company, such as at a home. Further, it may be helpful to determine whether the user is accessing the hosted applications and services using the physical machines and other connectivity resources and infrastructure at a shared worksite, such as a coffee shop, a hotel, etc., where multiple different users may be accessing different hosted services and applications, under different accounts, but from a similar location.

Once user classification is known to be onsite or remote, then the performance analysis, suggestions, and configuration recommendations can be made in a way that is more likely to improve performance Thus, the present description proceeds with respect to a system that collects non-personal network attributes, such as the IP address from which a customer is accessing the hosted applications and services (obfuscated to a desired level of anonymity), the presence or absence of a virtual private network, the cardinality of an address resolution cache, local area network (LAN), and domain name service (DNS) server configurations, autonomous system number information and/or other non-personal network attributes and generates a classification output classifying the user as a remote user or an onsite user (or possibly a user at a shared workspace) based upon the non-personal network attributes. The classification system can be a machine learned classifier, a heuristics-based classifier, or another type of rules-based classifier or classification model.

FIG. 1 is a block diagram of one example of a computing system architecture 100 in which a server computing system 102 hosts an application and/or service for access by a plurality of different users over a network 104. In the example shown in FIG. 1, server computing system 102 hosts services and/or applications for a set of onsite users 106-108 that are physically located at the physical premises of an organization 110. Onsite users 106-108 use user devices 112-114 to access one or more client computing systems 116 that provide connectivity functionality 118 so that users 106-108 can access server computing system 102 over network 104. Therefore, client computing system 116 can include one or more processors or servers 120, data store 122, data gathering functionality 124, and other items 126. The connectivity functionality 118 in client computing system 116 can include the physical machines and other connectivity resources and infrastructure for providing local network connection functionality 128, wide area network connection functionality 130, and other items 132. Connectivity functionality 118 can thus include router(s), network adapter(s), gateway(s), etc. Data gathering functionality 124 can gather connectivity performance data, such as latencies, page load times and other connectivity data indicative of the connectivity performance being experienced by client computing system 116 and user devices 112-114. The data gathered by functionality 124 can be sent to server computing system 102.

Also, in the example shown in FIG. 1, server computing system 102 can host services and applications for a remote user 134 which accesses a client computing system 136 through a user device 138. Client computing system 136 can include one or more processors or servers 140, data store 142, connectivity functionality 144, data gathering functionality 146, and other items 148. Connectivity functionality 144 can include the physical machines, and other connectivity resources and infrastructure that provide wide area network connection functionality 150, local area network connection functionality 151, virtual private network (VPN) functionality 152, and other items 156. Connectivity functionality 144 can thus include router(s), network adapter(s), gateway(s), etc. Data gathering functionality 146 can gather connectivity performance data, such as latencies, page load times, and other connectivity data indicative of the connectivity performance being experienced by client computing system 136 and user device 138. The data gathered by functionality 146 can be sent to server computing system 102.

Therefore, in the example shown in FIG. 1, user devices 112 and 114 at organization 110 may be desktop computers, laptop computers, tablet computers, mobile devices, or other devices that onsite users 106 and 108 use to interact with client computing system 116 in order to gain access to hosted services and applications on server computing system 102. The connection functionality 118 in client computing system 116 can include the routers, servers and other physical machines and infrastructure that is used to provide that connectivity. Similarly, user device 138 may be a mobile device, a desktop computer, a laptop computer, a tablet computer, or another computing device that remote user 134 uses to access the hosted applications and services at server computing system 102. Thus, the connection functionality 144 in client computing system 136 may provide the physical machines and infrastructure, such as routers, adapters, etc., that provide the connectivity that user device 138 uses to connect to server computing system 102.

Server computing system 102 can include one or more processors or servers 160, data store 162, backend system 164, frontend system 166, connectivity processing system 168, administrative system 170, and any of a wide variety of other server computing system functionality 172. Connectivity processing system 168 can include connectivity data collection system 174 which, itself, includes source IP address detector 176, address resolution protocol (ARP) cache cardinality detector 178, local area network (LAN) subnet internet protocol IP address detector 180, domain name service (DNS) server (IP) address detector 182, virtual private network (VPN) detector 184, autonomous system number (ASN) source IP address detector 186, and other items 188. Connectivity processing system 168 can also include onsite/remote classification system 190, connectivity analysis system 192, output generator 194, and other items 196. Before describing the overall operation of architecture 100, a brief description of some of the items in architecture 100, and their operation, will first be provided.

Data store 162 can include hosted applications and/or services 198 and organization or user data (e.g., tenant data) 199, access logs 201, as well as other items 203. Frontend system 166 can expose an interface that is accessible by client computing systems 116 and 136 so that onsite users 106-108 and remote user 134 can provide requests to access and manipulate data 199 using the hosted applications and/or services 198. Frontend system 166 provides those requests to backend system 164 which interacts with data 199 in order to perform operations based on the request received. Backend system 164 can then return a result of the operations performed to frontend system 166 which can, in turn, make that information available to client computing systems 116 and 136 through the exposed interface.

Access logs 201 log the data access requests and operations that are received from users 106-108, 134 and that are performed on the data 199. The access requests 201 can include information such as the source IP address for the request, the particular customer and/or user corresponding to the request, the autonomous system number and IP address corresponding to the autonomous system number from which the request was received, network adapter and default gateway IP address the IP address for the local area network and DNS server corresponding to the request, and whether a virtual private network is detected, among other things.

Connectivity processing system 168 obtains information from the access logs 201 that log information corresponding to access requests from the various users of the hosted applications and services 198. System 168 can also obtain information from data gathering functionality 124 and 146. Source IP address detector 176 identifies the source IP address for a given access request. In one example, the source IP address is obfuscated to a larger pool of IP addresses to maintain anonymity. For instance, the source IP address may be obfuscated to five source IP addresses or to a larger number, such as 250, of source IP addresses.

ARP cache cardinality detector 178 detects the cardinality of the ARP cache that is maintained by the default gateways at client computing systems 116 and 136. The address resolution protocol (ARP) is the protocol that is used to translate an IP address to a physical address. After a particular IP address is resolved to its physical address, the result of that resolution can be stored in the ARP cache so that the physical address can be obtained for the same IP address without repeating the resolution process. In one example, the default gateway in connectivity functionality 148 can send an ARP request (the IP address of the desired destination device) to all devices 112-114 and the device 112-114 that has that IP address responds with an ARP reply that includes its physical address (its media access control-MAC-address) and that physical address can then be stored in the ARP cache so it can be used without repeating the resolution process. The number of entries in the ARP cache (e.g., the cardinality of the ARP cache) may vary dynamically, in that it changes over time. Therefore, ARP cache cardinality detector 178 may intermittently count the number of entries in the various ARP caches in architecture 100 and log those counts.

LAN subnet IP address detector 180 detects the LAN subnet IP address corresponding to the request, and DNS server IP address detector 182 detects the DNS server IP address corresponding to the request. Virtual private network (VPN) detector 184 detects whether a VPN is present, and ASN source IP detector 186 detects the IP address, and the owner of the IP address, corresponding to the autonomous system number which identifies the gateway from which the request was received.

Based upon the information detected by connectivity collection system 174, onsite/remote classification system 190 classifies a particular record as coming from a user who is an onsite user (such as an onsite user 106-108) or a remote user (such as remote user 134). As discussed above, the physical machines and other connectivity resources and infrastructure that provide connectivity to the two different types of users is normally quite different. Thus, recommendations as to how to improve connectivity performance will vary widely based upon the type of user as well. Therefore, onsite/remote classification system 190 provides a classification output to connectivity analysis system 192 indicating whether the user corresponding to the connectivity information is an onsite user or a remote user.

Connectivity analysis system 192 can then perform analysis on the connectivity data to identify how well the user's connectivity machines and other connectivity resources and infrastructure are performing, and to also identify suggestions or recommendations for improving that performance. Connectivity analysis system 192 provides an output indicative of the analyzed performance, the recommendations and suggestions to improve performance, and other information to output generator 194. Output generator 194 generates control signals to control administrative system 170 so an output can be surfaced to an administrative user through administrative system 170.

Figure 2:
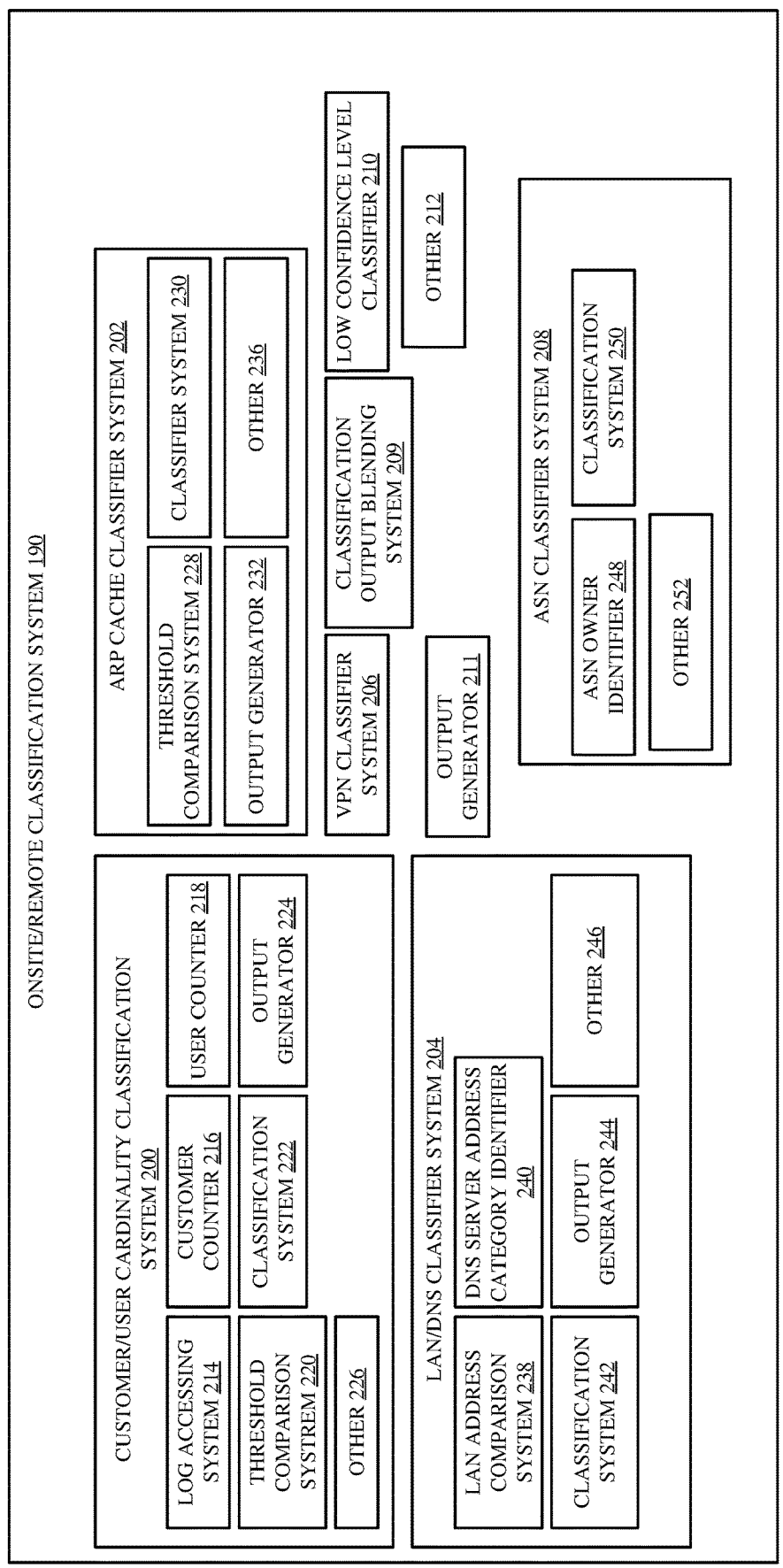
FIG. 2 is a block diagram of one example of an onsite/remote classification system.

FIG. 2 shows one example of onsite/remote classification system 190 in more detail. It will be appreciated that the functionality of onsite/remote classification system 190 can be implemented in a machine learned model, a classifier, such as a Bayesian network, an artificial neural network, or another type of classifier, or as a rules or heuristic-based classifier. Thus, while separate classifier systems are shown for the sake of example, they could be embodied in a single classifier or a group of classifiers.

Onsite/remote classification system 190 can include customer/user cardinality classifier system 200, ARP cache classifier system 202, LAN/DNS classifier system 204, VPN classifier system 206, ASN classifier system 208, classification output blending system 209, low confidence level classifier 210, output generator 211, and other items 212. Customer/user cardinality classifier system 202 can include log accessing system 214, customer counter 216, user counter 218, threshold comparison system 220, classification system 222, output generator 224, and other items 226. ARP cache classifier system 202 can include threshold comparison system 228, classification system 230, output generator 232, and other items 236. LAN/DNS classifier system 204 can include LAN address comparison system 238, DNS server address category identifier 240, classification system 242, output generator 244, and other items 246. ASN classifier system 208 can include ASN owner identifier 248, classification system 250, and other items 252. Before describing the overall operation of onsite/remote classification system 190 in more detail, a brief description of some of the items in system 190, and their operation, will first be provided.

Customer/user cardinality classifier system 200 accesses the records of customer access logs 201 and determines the number of customers and the number of users accessing the hosted applications and services from each different source IP address. For each IP address in log 201, customer counter 216 counts the number of customers accessing the hosted applications and services 198 over a given period of time. For each IP address in log 201, user counter 218 counts the number of users seen accessing applications and services 198 over that same period of time. Threshold comparison system 220 then compares the customer cardinality and user cardinality for each IP address with threshold levels and provides an output indicative of that comparison to classification system 222. Classification system 223 then classifies the user corresponding to each source IP address as an onsite user or a remote user. It will be appreciated that the same operation can be performed for a set of source IP addresses in order to obfuscate or anonymize the IP addresses. In that case, the group of IP addresses is classified together.

As an example of using customer and user cardinality for classification, if the customer cardinality for a particular IP address is low, but the user cardinality is high, that means that there are a relatively large number of users accessing server computing system 102 from that IP address, but a relatively low number of customers. This would indicate that the ratio of users to customers is high, and would tend to indicate that the users are onsite users rather than remote users. However, if the user cardinality is low, and the customer cardinality is also low, then this would tend to indicate that the user is a remote user. If the user and/or customer cardinality are at a medium level, so that the IP address has an approximate one-to-one ratio of customers to users, then this may indicate that the IP address belongs to a shared workspace, such as a hotel or coffee shop, etc. Classification system 222 thus generates a classification output indicating whether the user is likely an onsite user, a remote user, or a user at a shared workspace.

Classification system 222 can also generate and output a confidence level corresponding to the classification output. For instance, if the user cardinality is extremely high, and the customer cardinality is extremely low, then classification system 222 may generate a classification output indicating that the user is likely an onsite user, and it will also generate a relatively high confidence level corresponding to that classification output. Thus, the confidence level may vary based upon how far the cardinalities exceed the threshold levels, or based on other criteria. Output generator 224 can generate an output indicative of the classification output and confidence level.

The threshold comparison system 228 in ARP cache classifier system 202 can compare the ARP cache cardinality for the ARP cache of a default gateway having an IP address corresponding an access request (received from ARP cache cardinality detector 178) against one or more different threshold values. The result of the comparison against the threshold values is provided to classification system 230, which classifies the user as an online user or remote user based upon the comparison result. For example, if the cardinality of the ARP cache is less than 20 for a machine operating for a 24 hour period, then this is likely a remote user because the ARP cache likely belongs to a default gateway for a home network. However, if the ARP cache cardinality is high, then classification system 230 may classify the user as an onsite user because the gateway likely belongs to an onsite network. The degree to which the ARP cache cardinality exceeds or is below the threshold value may be used by system 230 to generate a confidence level that is provided, along with the classification output. Output generator 232 can generate control signals to output the classification output and confidence level.

There may be common LAN IP subnet addresses that normally belong to home-based networks. Therefore, LAN address comparison system 238 in LAN/DNS classifier system 204 compares the LAN subnet IP address provided by detector 180 to a list of IP addresses that are commonly addresses for home networks. Some such common home-based network addresses include (as examples only):

192.168.1.0,
192.168.0.0,
10.0.0.0,
192.168.2.0.

DNS server address category identifier 240 identifies whether the IP address of the DNS server (provided by detector 182) is a private IP Address or a public IP address and whether the IP address of the DNS server is the same as the IP address of the default gateway for the source of the request. If the DNS server has a private IP address, this tends to indicate that the user is an onsite user. If the DNS server has a public IP address and/or if the DNS server has the same IP address as the default gateway, then this tends to indicate that the user is a remote user. The outputs from LAN address comparison system 238 and DNS server address category identifier 240 are provided to classification system 242 which classifies the user as an onsite user or a remote user based upon those outputs. Classification system 242 can also generate a confidence level corresponding to the classification output. For instance, if the LAN subnet IP address is one of the addresses that is commonly used in a home network and the DNS server IP address is public and is the same as the default gateway, then classification system 242 may provide a classification output indicating that the user is a remote user and may also provide a high confidence level corresponding to that classification output. Output generator 244 can generate control signals to output the classification output and confidence level provided by classification system 242.

ASN owner identifier 248 receives the ASN source IP address detected by detector 186. The ASN represents the routing owner of a set of IP address ranges. Some ASNs can be easily classified as belonging to consumer Internet Service Providers (ISPs) and others can be easily identified as corresponding to large enterprises. Thus, the ASN owner identifier 248 identifies the ASN owner and provides that to classification system 250. Classification system 250 generates a classification output that classifies the user as an onsite user or a remote user, based upon the ASN owner, along with a confidence level.

It may be that the outputs of one or more of systems 200, 202, 204, 206 and 208 have a high enough confidence level that they can be relied on to classify the user as an onsite user or a remote user, without further processing. For instance, if the classification output from customer/user cardinality classifier system 200 indicates that the user is an onsite user and has a very high confidence level, then this may be output by onsite/remote classification system 190 without the remainder of the systems 204-208 having to classify the user. However, it may be that the output of system 200 has a medium confidence level, or a low confidence level, at which point system 190 can continue to invoke other systems 202-208 to classify the user. By way of example, if system 200 classifies the user as an onsite user with a medium confidence level, and system 202 also classifies the user as an onsite user with a medium classification level, then this may be enough to indicate that the likelihood of the user being an onsite user is high, and system 190 need not invoke the remaining systems 204-208.

However, it may be that the different systems 200-208 provide conflicting classifications (where some classify the user as an onsite user while others classify the user as a remote user), or they may all provide outputs with relatively low confidence levels. In these scenarios, classification output blending system 209 can receive, as inputs, the outputs from the various systems 200-208, and their confidence levels, and generate an output that classifies the user, based upon those inputs. System 209 can, itself, be another classifier that takes the outputs from the other systems 200-208 as inputs and classifies the user based upon those inputs. System 209 can also run a blending algorithm that weights the outputs from the various systems 200-208 to generate a classification output. These and other mechanisms can be used to provide a classification output when none can be clearly provided from the outputs of systems 200-208.

Similarly, low confidence level classifier 210 may generate an output when the outputs of systems 200-208 tend to indicate that the user is either an onsite user or a remote user, but the confidence levels corresponding to those outputs is relatively low. System 190 can also generate an output indicating that the classification of the user is unknown, where the systems 200-209 and classifier 210 are unable to classify the user adequately.

Figure 3:
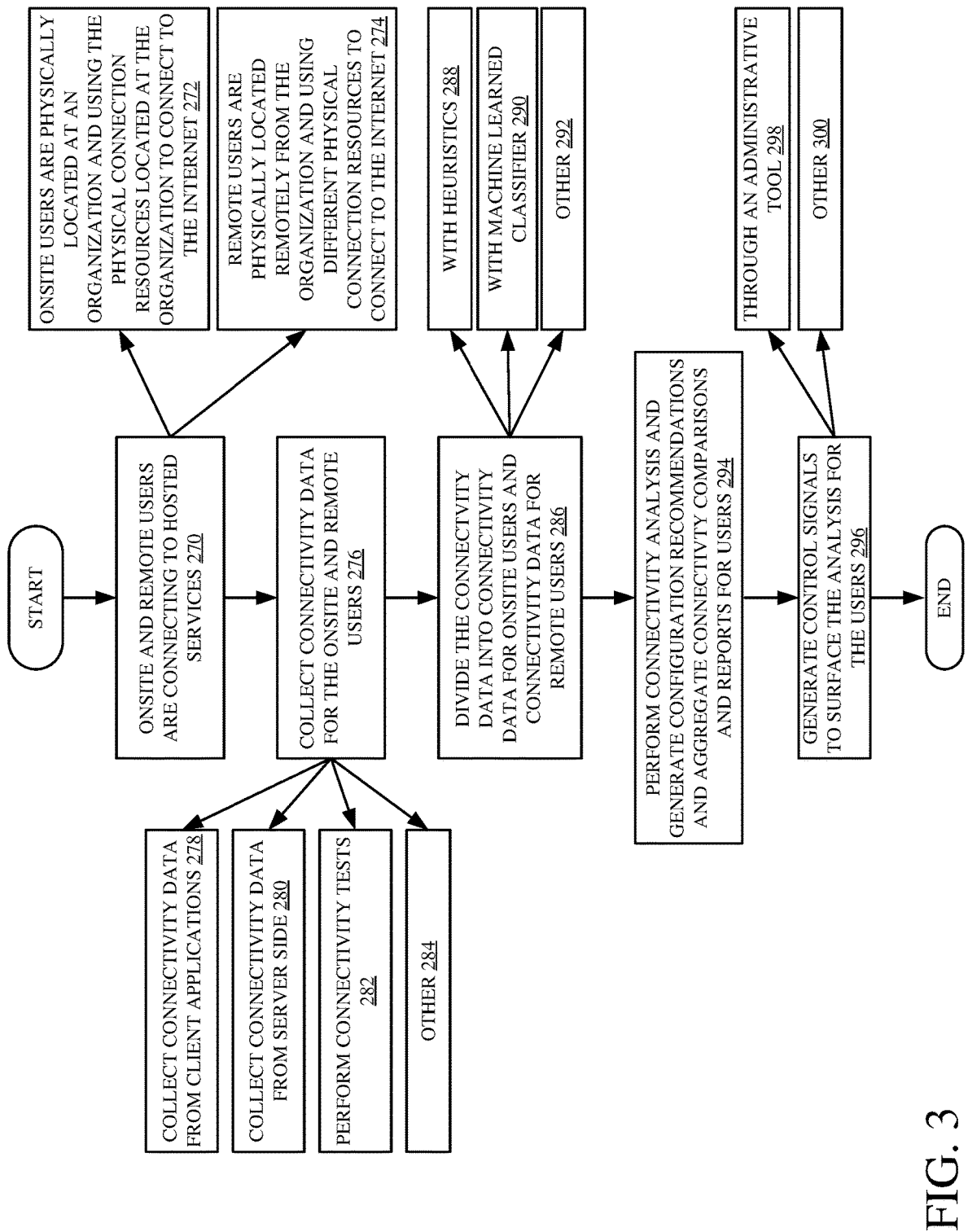
FIG. 3 is a flow diagram showing one example of the operation of a computing system architecture.

FIG. 3 is a flow diagram illustrating one example of the operation of computing system architecture 100 in collecting connectivity data, classifying users and generating control signals to control administrative system 170 to surface the results of analysis, suggestions and configuration recommendations based upon the connectivity data. It is first assumed that both onsite users 106-108 and remote users 134 are connecting to the hosted applications and services 198, as indicated by block 270 in the flow diagram of FIG. 3. As discussed above, the onsite users 106-108 may be users that are physically located at an organization and using the physical connection resources of the organization to connect to the hosted applications and services, as indicated by block 272. The remote users 134 may be physically located remotely from the organization 110 and using different physical connection resources to connect to the Internet and the hosted applications and services 198, as indicated by block 274 in the flow diagram of FIG. 3.

Connectivity processing system 168 then detects connectivity data for the onsite and remote users as indicated by block 276 in the flow diagram of FIG. 3. The connectivity data can be collected from the data gathering functionality 124, 146 in client computing systems 116, 136, respectively. The connectivity data can also be collected from client applications running on client computing systems 116 and 136, as indicated by block 278. The connectivity data can be collected from the server side, such as from user access logs 201 or other server side data collection, as indicated by block 280 in the flow diagram of FIG. 3. In addition, connectivity processing system 168 can gather other connectivity data by performing connectivity tests to test latency, page load times, etc., as indicated by block 282. The connectivity data can be collected in other ways as well, as indicated by block 284.

Onsite/remote classification system 190 then divides the connectivity data into connectivity data for onsite users and connectivity data for remote users, as indicated by block 286 in the flow diagram of FIG. 3. Thus, the data records (e.g., connectivity data for access requests or other data records) representing the items of collected connectivity data can be processed by connectivity processing system 168 to determine whether they are for an onsite user or a remote user. As mentioned above, onsite/remote classification system 190 can do this can be done using heuristics, as indicated by block 288 or using a machine learned classifier, as indicated by block 290, or in other ways, as indicated by block 292.

Connectivity analysis system 192 then performs connectivity analysis and generates configuration recommendations and aggregates connectivity comparisons for administrative users. Performing the connectivity analysis and generating the outputs is indicated by block 294 in the flow diagram of FIG. 3. Output generator 194 generates control signals to provide an output indicative of the analysis results and generates control signals to surface the analysis for administrative users on administrative system 170, as indicated by block 296 in the flow diagram of FIG. 3. The analysis results can be surfaced through an administrative tool 298 or in other ways, as indicated by block 300.

Figure 4A:
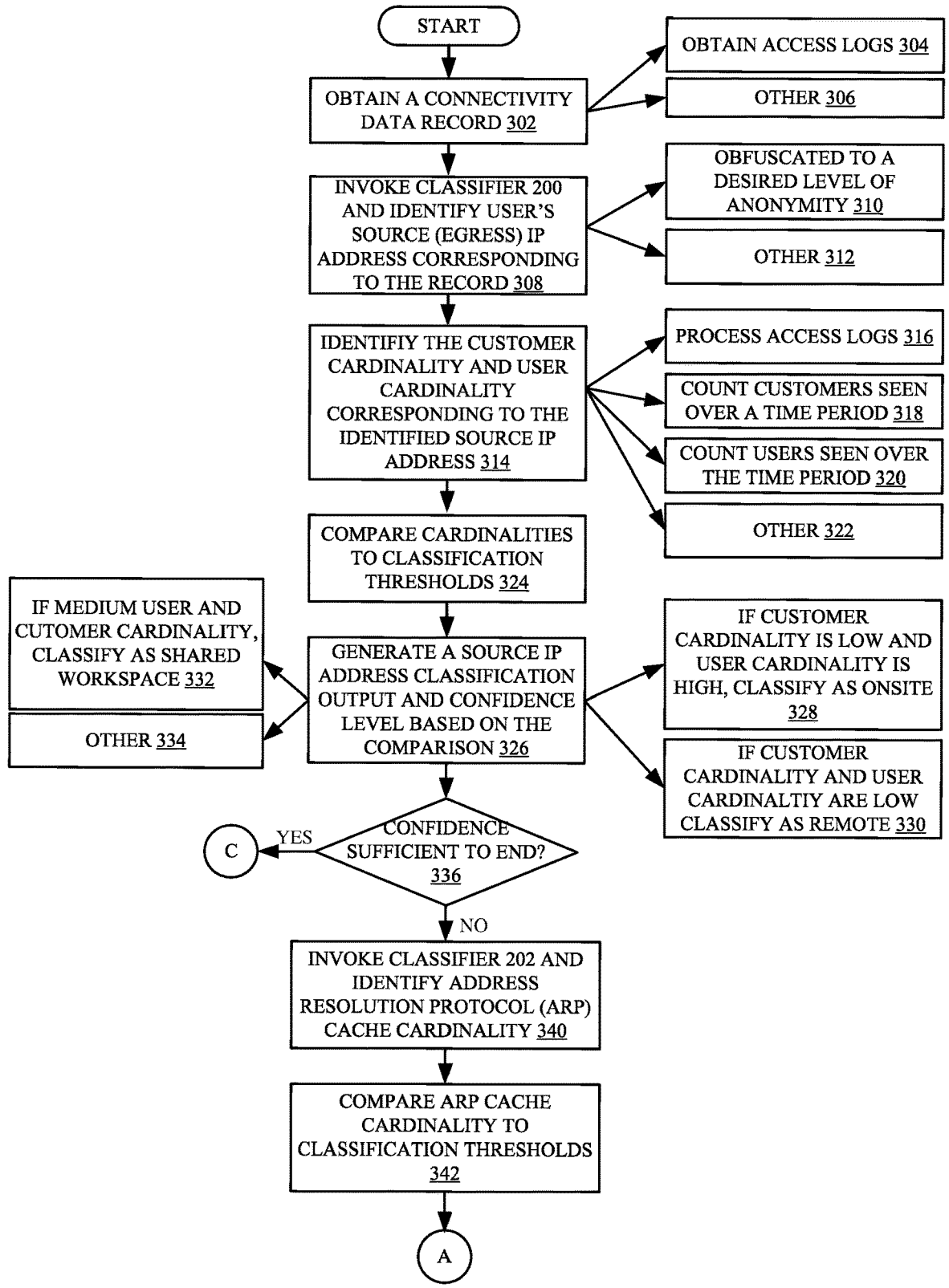
FIGS. 4A, 4B and 4C (collectively referred to herein as FIG. 4) show a flow diagram illustrating the operation of one example of a connectivity processing system.
Figure 4B:
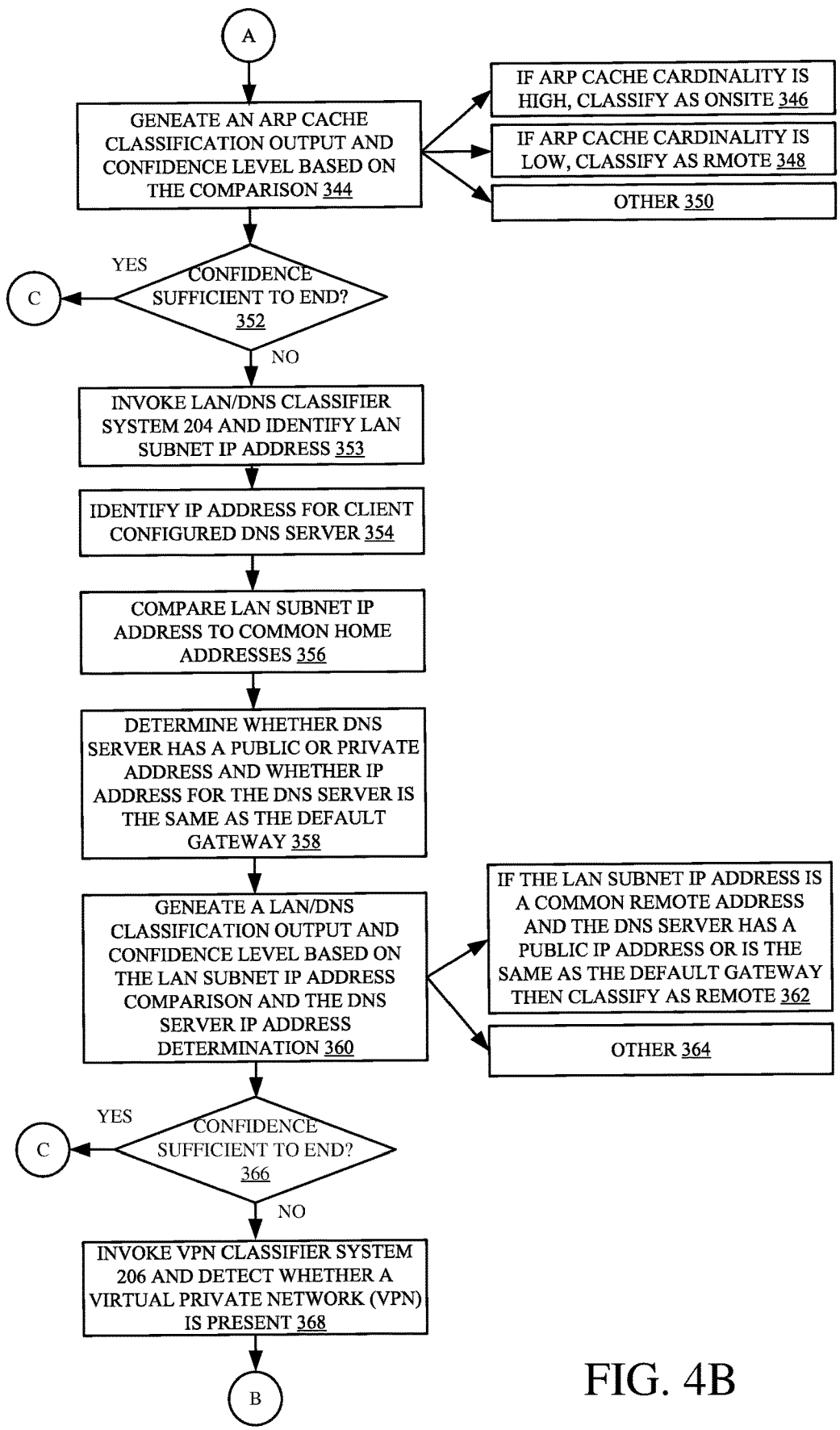
Figure 4C:
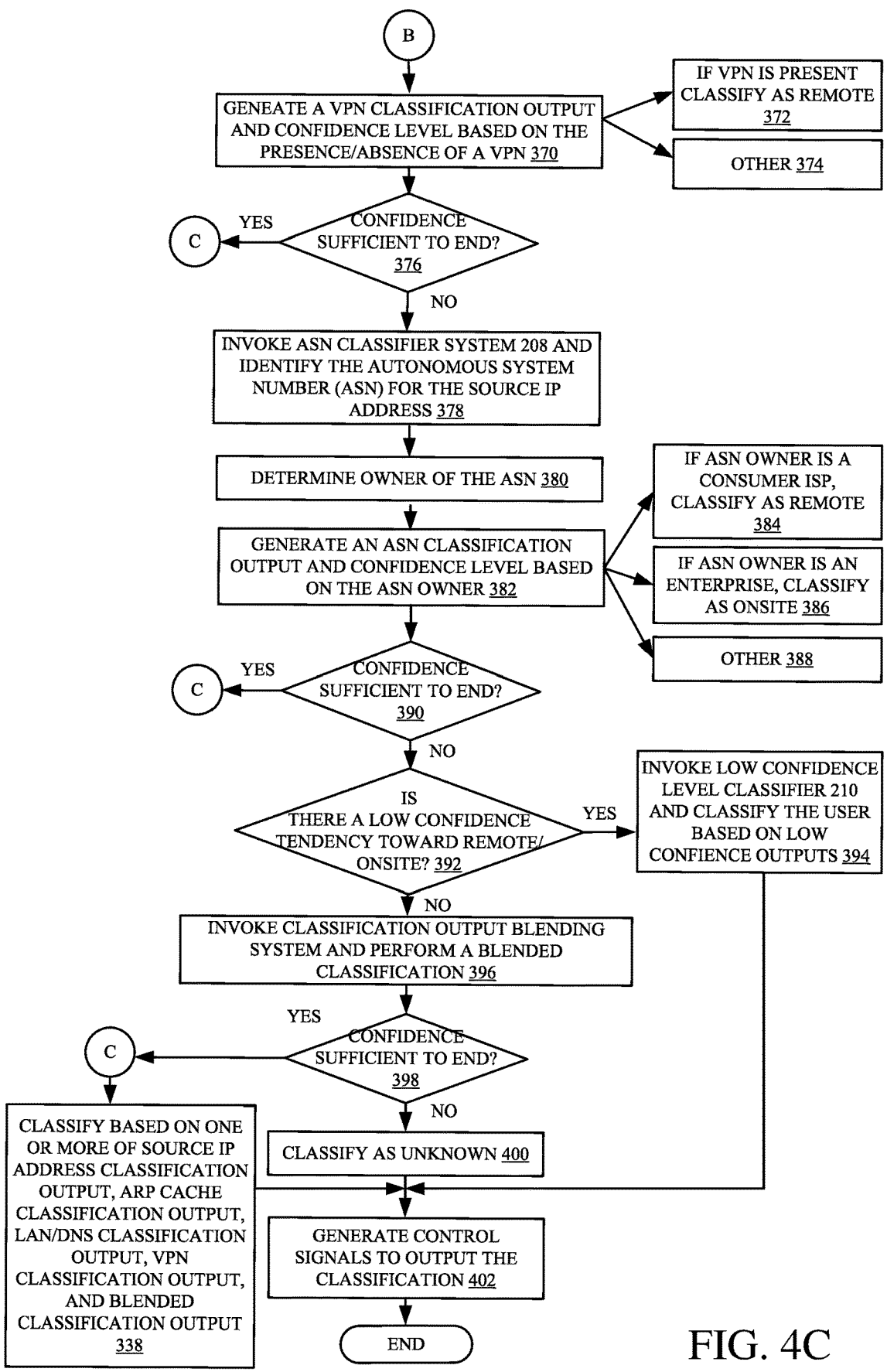

FIGS. 4A, 4B, and 4C (collectively referred to herein as FIG. 4) show a flow diagram illustrating one example of the operation of onsite/remote classification system 190 (discussed above with respect to FIG. 2) in more detail. It will be noted that FIG. 4 sets out a particular order in which the systems 200-210 analyze connectivity data and classify the user as an onsite user or a remote user. However, it will be appreciated the order in which systems 200-210 perform their processing can be switched. The order set out in the flow diagram of FIG. 4 is set out by way of example only, and other orders can be used as well.

Connectivity processing system 168 first obtains a connectivity data record to be classified, as indicated by block 302. The connectivity data record can be obtained from the access logs 201 in data store 162, as indicated by block 304, or in other ways, as indicated by block 306. For purposes of the present description, the data record will be referred to as including connectivity data (network attributes) corresponding to a data access request from a client computing system. The record illustratively includes connectivity data collected by the data gathering functionality on the client computing system, server side connectivity data, test results generated by connectivity processing system 168 and/or other connectivity data.

Source IP address detector 176 then identifies the user's source (egress) IP address corresponding to the connectivity data record. Identifying the user's source IP address is indicated by block 308 in the flow diagram of FIG. 4. As discussed elsewhere, the user's source IP address can be obfuscated to a desired level of anonymity, as indicated by block 310, and it can be obtained in other ways, as indicated by block 312.

Customer counter 216 and user counter 218 can process the data records together or separately. Counters 216 and 218 identify the customer cardinality and user cardinality corresponding to each source IP address identified in log(s) 201, as indicated by block 314. This can be done by counting different users and customers that access system 102 over each IP address in the access logs 201, as indicated by block 316. The number of customers and users seen using each source IP address, over a particular time period, can be counted as indicated by blocks 318 and 320. The customer cardinality and user cardinality for each source IP address can be updated over time and stored as connectivity data for the corresponding IP address in log(s) 201 or elsewhere. Classifier system 200 can thus obtain the customer and user cardinality for the source IP address of the data record under analysis from log(s) 201. The customer and user cardinality corresponding to the source IP address can be obtained in other ways as well, as indicated by block 322.

Threshold comparison system 220 then compares the cardinalities to different classification thresholds, as indicated by block 324 in the flow diagram of FIG. 4. Classification system 222 generates a source IP address classification output, and a confidence level, based upon the cardinalities of the source IP address, given the comparison results from threshold comparison system 220. Generating a source IP address classification output and corresponding confidence level based upon the comparison of the customer and user cardinalities to threshold values is indicated by block 326 in the flow diagram of FIG. 4.

By way of example, if the customer cardinality is relatively low (fails to meet a customer cardinality threshold) and the user cardinality is high (exceeds a user cardinality threshold) then classification system 222 may classify the user as an onsite user, as indicated by block 328 in the flow diagram of FIG. 4. However, if the customer cardinality and user cardinality are both low, then classification system 222 may classify the user as a remote user, as indicated by block 330. If the user and customer cardinalities are both in a medium range (such as above a low threshold value but below a high threshold value), then classification system 222 may classify the user as working from a shared workspace, as indicated by block 332. The source IP address classification output and corresponding confidence level can be generated in other ways as well, as indicated by block 334.

If, at block 336, it is determined that the confidence level corresponding to the source IP address classification output is sufficiently high (e.g., it exceeds a confidence level threshold), then onsite/remote classification system 190 can output the classification of the user as an onsite or remote user, without further processing. Classifying the user as onsite or remote based upon one or more of the outputs from systems 200-208 is indicated by block 338 in the flow diagram of FIG. 4.

However, if at block 336, it is determined that the confidence level output by classification system 222 is not sufficient, then system 190 invokes ARP cache classifier system 202. ARP cache cardinality detector 178 generates an output indicative of the ARP cache cardinality and provides it to ARP cache classifier system 202, as indicated by block 340 in the flow diagram of FIG. 4. Threshold comparison system 228 compares the ARP cache cardinality to one or more classification thresholds, as indicated by block 342. Based upon the comparison results, classification system 230 generates an ARP cache classification output and a corresponding confidence level, as indicated by block 344. For example, if the ARP cache cardinality is high (e.g., it exceeds a high threshold value) then classification system 230 can classify the user as an onsite user, as indicated by block 346. If the ARP cache cardinality is low (meaning that it does not meet a low threshold value) then classification system 230 can classify the user as a remote user, as indicated by block 348. The classifications system 230 can generate other outputs as well, as indicated by block 350. Again, system 190 determines whether the confidence level corresponding to the ARP cache classification output is sufficient to end processing, as indicated by block 352. This can also be done by comparing the confidence level to a threshold confidence level. If so, processing proceeds at block 338 where classification system 190 outputs the classification of the user without further processing.

However, if, at block 352 it is determined that the confidence level corresponding to the ARP cache classification output is not sufficient to end processing, then system 190 invokes LAN/DNS classifier system 204, and LAN subnet IP address detector 180 can identify the LAN subnet IP address corresponding to the data record under analysis, and DNS server IP address detector 182 can detect the DNS server IP address for the data record under analysis. These IP addresses can be provided to LAN/DNS classifier system 204. Identifying the LAN subnet IP address is indicated by block 353 in FIG. 4 and identifying the IP address for the client configured DNS server is indicated by block 354 in FIG. 4.

LAN address comparison system 238 then compares the LAN subnet IP address to a set of IP addresses that are commonly assigned to home networks, as indicated by block 356. DNS server address category identifier 240 also determines whether the DNS server has a public or private IP address and whether the IP address for the DNS server is the same as the default gateway, as indicated by block 358. Based upon the outputs from LAN address comparison system 238 and DNS server address category identifier 240, classification system 248 generates a LAN/DNS classification output and corresponding confidence level, as indicated by block 360 in the flow diagram of FIG. 4. By way of example, if classification system 242 determines that the LAN subnet IP address is a common remote address and the DNS server has a public IP address or it is the same as the default gateway, then classification system 242 can classify the user as a remote user, as indicated by block 362. The classification system 242 can generate a LAN/DNS classification output and confidence level in other ways as well, as indicated by block 364.

If the confidence level corresponding to the LAN/DNS classification output is sufficient to end further processing, as indicated by block 366, then processing again skips to block 338 where classification system 190 outputs the user classification. However, if, at block 366 it is determined that the confidence level is not sufficient to end processing, then system 190 invokes VPN classifier system 206 and VPN detector 184 can detect whether a virtual private network (VPN) is present on the connectivity record under analysis. Determining whether a VPN is present is indicated by block 368 in the flow diagram of FIG. 4. VPN classifier system 206 can then generate a VPN classification output and corresponding confidence level based upon the presence or absence of a VPN, as indicated by block 370. For instance, if a VPN is present, the user can be classified as a remote user, as indicated by block 372. The VPN classification output and confidence level can be generated in other ways as well, as indicated by block 374.

System 190 can then determine whether the confidence level corresponding to the VPN classification output is sufficient to end the processing, as indicated by block 376. If so, processing again reverts to blocks 338. However, if, at block 376 it is determined that the confidence level is not sufficient to end processing, then system 190 invokes ASN classifier system 208 and ASN source IP address detector 186 can identify the ASN for the source IP address, as indicated by block 378, and ASN owner identifier 248 can determine the owner of the ASN, as indicated by block 380. Classification system 250 then generates an ASN classification output and corresponding confidence level based upon the ASN owner, as indicated by block 382. For example, classification system 250 can classify the user as a remote user if the ASN owner is identified as a consumer ISP, as indicated by block 384. Classification system 250 can classify the user as an onsite user if the ASN owner is identified as an enterprise, as indicated by block 386. The classification system 250 can generate the ASN classification output and corresponding confidence level in other ways as well, as indicated by block 388.

If, at block 390, classification system 190 determines that the confidence level corresponding to the ASN classification output is high enough to end processing, then the processing again jumps to block 338. However, if at block 390 system 190 determines that the confidence level is not high enough to end processing, then system 190 can invoke low confidence level classifier 210.

At block 392, low confidence level classifier 210 determines whether systems 200-202 have generated outputs that tend to indicate one classification (e.g., that the user is either onsite or remote), but that the outputs have corresponding confidence levels that are too low to conclusively classify the user. In that case, low confidence level classifier 210 can still classify the user as either remote or onsite, based upon the preponderance of the outputs from systems 200-208, even though the confidence level is relatively low. For instance, assume systems 200, 202, 204 and 206 all generate outputs classifying the user as onsite, but those outputs have low confidence levels, and assume system 208 generates an output indicating that the user is a remote user, but that output also has a low confidence level. In these circumstances, low confidence level classifier 210 may classify the user as onsite, because the outputs from the systems 200-208 show a preponderance of outputs classifying the user that way, even though the confidence levels are low. This is just one example of how low confidence level classifier 210 can classify the user even though the outputs from the other systems have a relatively low confidence level. Classifying the user based upon on the tendency of the low confidence outputs of the other systems is indicated by block 394 in the flow diagram of FIG. 4.

Classification output blending system 209 can also generate an output by blending the outputs of the other systems in onsite/remote classification system 190. For instance, if the outputs from systems 204-208 are mixed outputs (some classifying the user as onsite, some classifying the user as remote, with varying confidence levels), so that no clear classification can be determined, then classification output blending system 209 can receive the outputs of the other systems as inputs as generate a final classification output based upon a combination of the outputs from the other systems. For example, classification output blending system 209 can weight the outputs of the other systems using empirically determined weighting criteria or in other ways.

System 209 can weight the outputs of the other systems based upon their corresponding confidence levels, or the outputs from the other systems can be considered unweighted. Similarly, the outputs from the other systems can be weighted based upon the particular system that generated them. By way of example, if system 200 has proven to be more accurate than system 204, then the output from system 200 may be weighted higher than the output from system 204. All of these and other mechanisms for combining the outputs from the other systems in onsite/remote classification system 190 to classify the user can be used. Performing a blended classification is indicated by block 396 in the flow diagram of FIG. 4. System 209 can also generate a confidence level corresponding to its classification output. If the confidence level is sufficient, as indicated by block 398 in the flow diagram of FIG. 4, then the output of system 209 will be used as the user classification.

After systems 200-210 in onsite/remote classification system 190 have generated their outputs, it may still be that the outputs are so conflicting, or they have such low confidence levels, that the classification can still not be determined with sufficient confidence. In that case, onsite/remote classification system 190 can classify the user as "unknown" or as otherwise unclassifiable. Classifying the user in this way is indicated by block 400 in the flow diagram of FIG. 4.

Output generator 211 then generates control signals to output the selected classification to connectivity analysis system 192, as indicated by block 402 in the flow diagram of FIG. 4.

It can thus be seen that the present system detects a variety of different types of non-personal networking attributes and classifies those attributes as corresponding to a user that is onsite, and thus uses the physical machines, resources and connectivity infrastructure of an organization to connect to the hosted services and applications, or as a remote user, in which case the user uses the physical machines, resources and connectivity infrastructure at a location other than the organization (e.g., home, or a shared workspace) to connect to the hosted services or applications. Control signals can then be generated to communicate the classification to another system for further analysis. The analysis can be surfaced for a user through an administrative or other system. The classification system discussed herein makes the computing system much more accurate in that network configurations can be generated to improve system performance in a way that is much more likely to improve that performance, because the source of the networking information is accurately classified.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. The displays can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which they are displayed is a touch sensitive screen, they can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
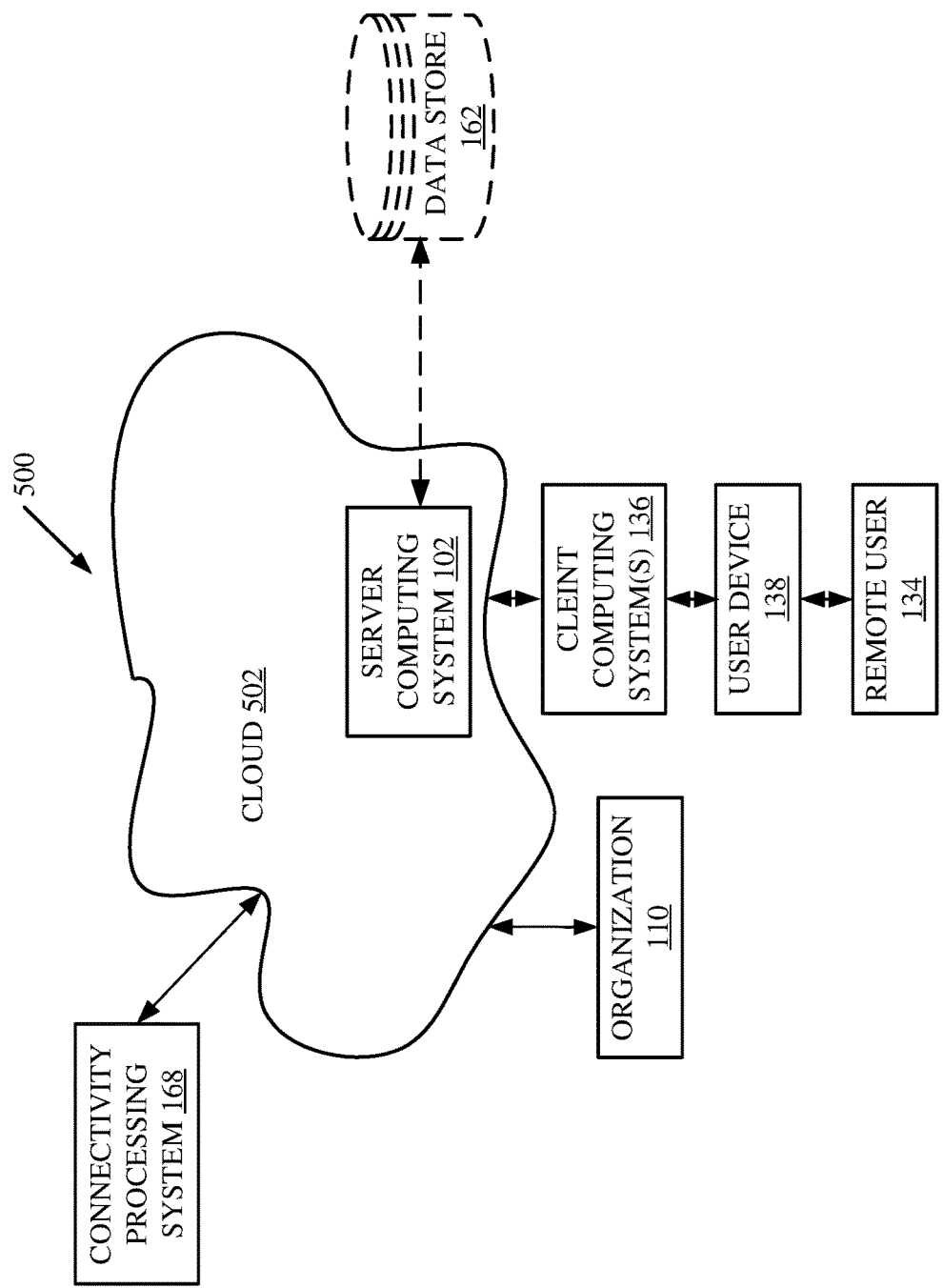
FIG. 5 shows an example of a remote server architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that server computing system 102 can be located in cloud 502 (which can be public, private, or a combination where portions are public while others are private).

FIG. 5 also depicts another example of a cloud architecture. FIG. 5 shows that it is also contemplated that some elements of computing system 102 can be disposed in cloud 502 while others are not. By way of example, data store 162 can be disposed outside of cloud 502, and accessed through cloud 502. In another example, connectivity processing system 168 (or other items) can be outside of cloud 502. Regardless of where the items are located, they can be accessed directly by client computing systems, through a network (either a wide area network or a local area network), the items can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
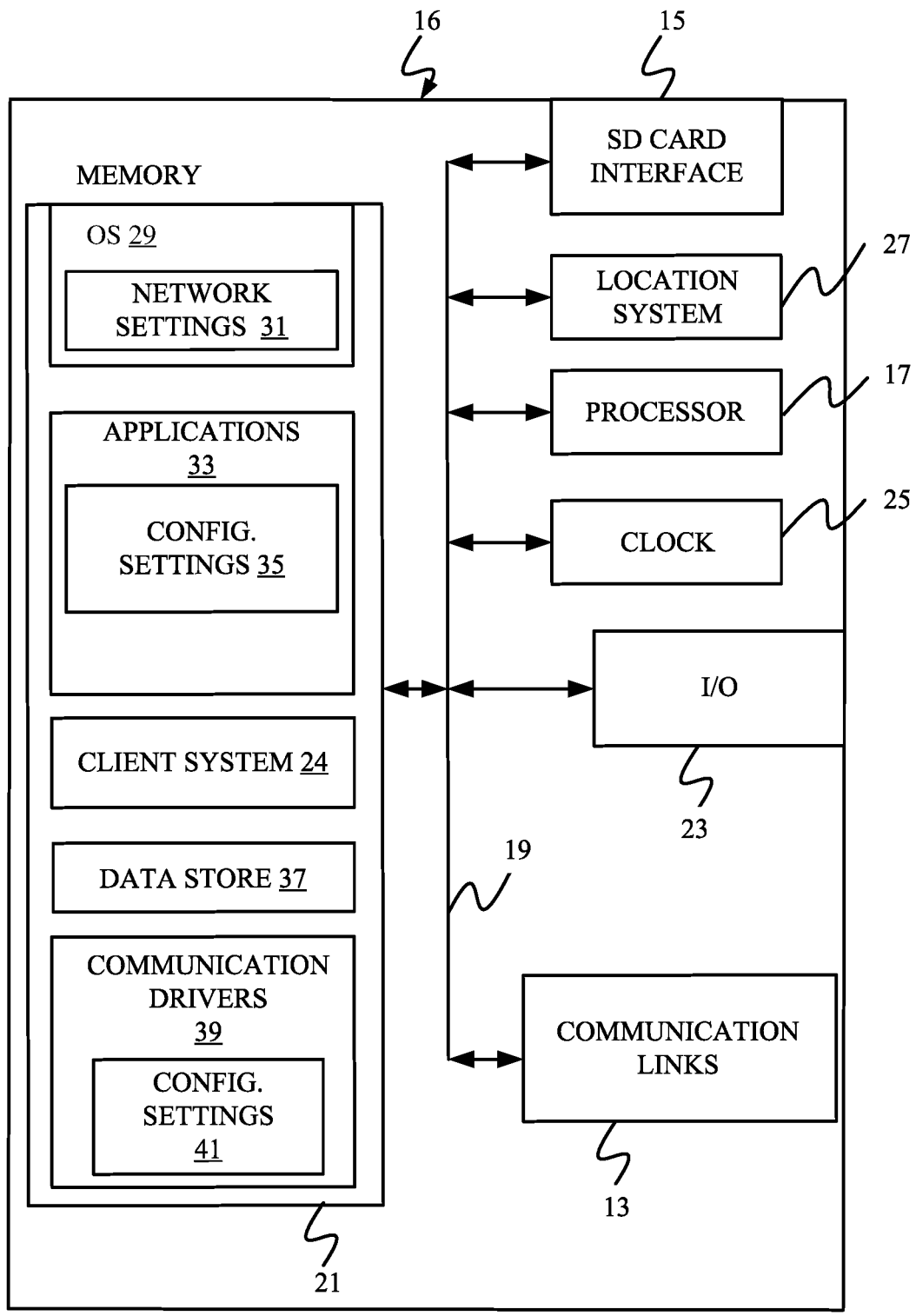
FIGS. 6-8 show examples of mobile devices.
Figure 7:
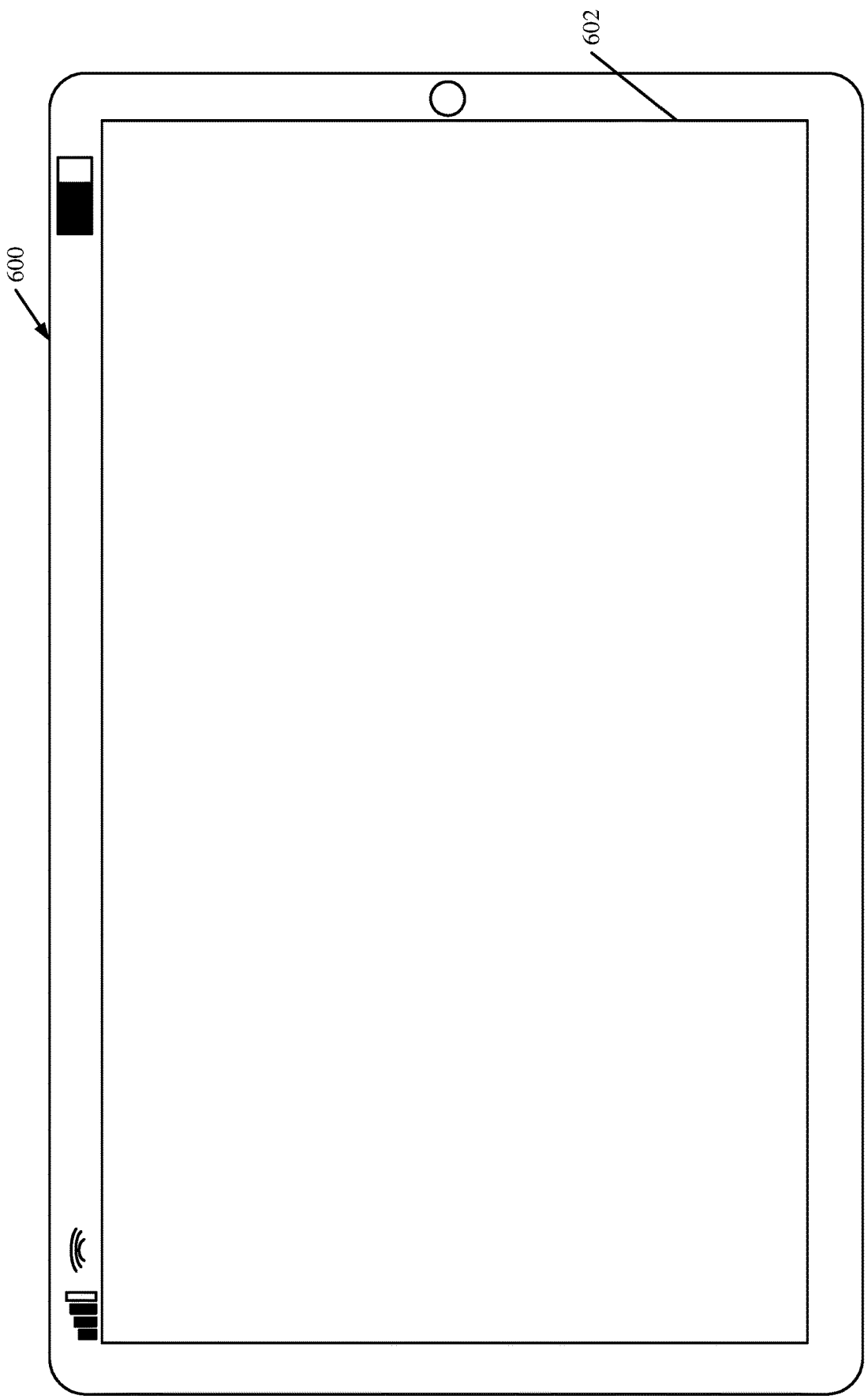
Figure 8:
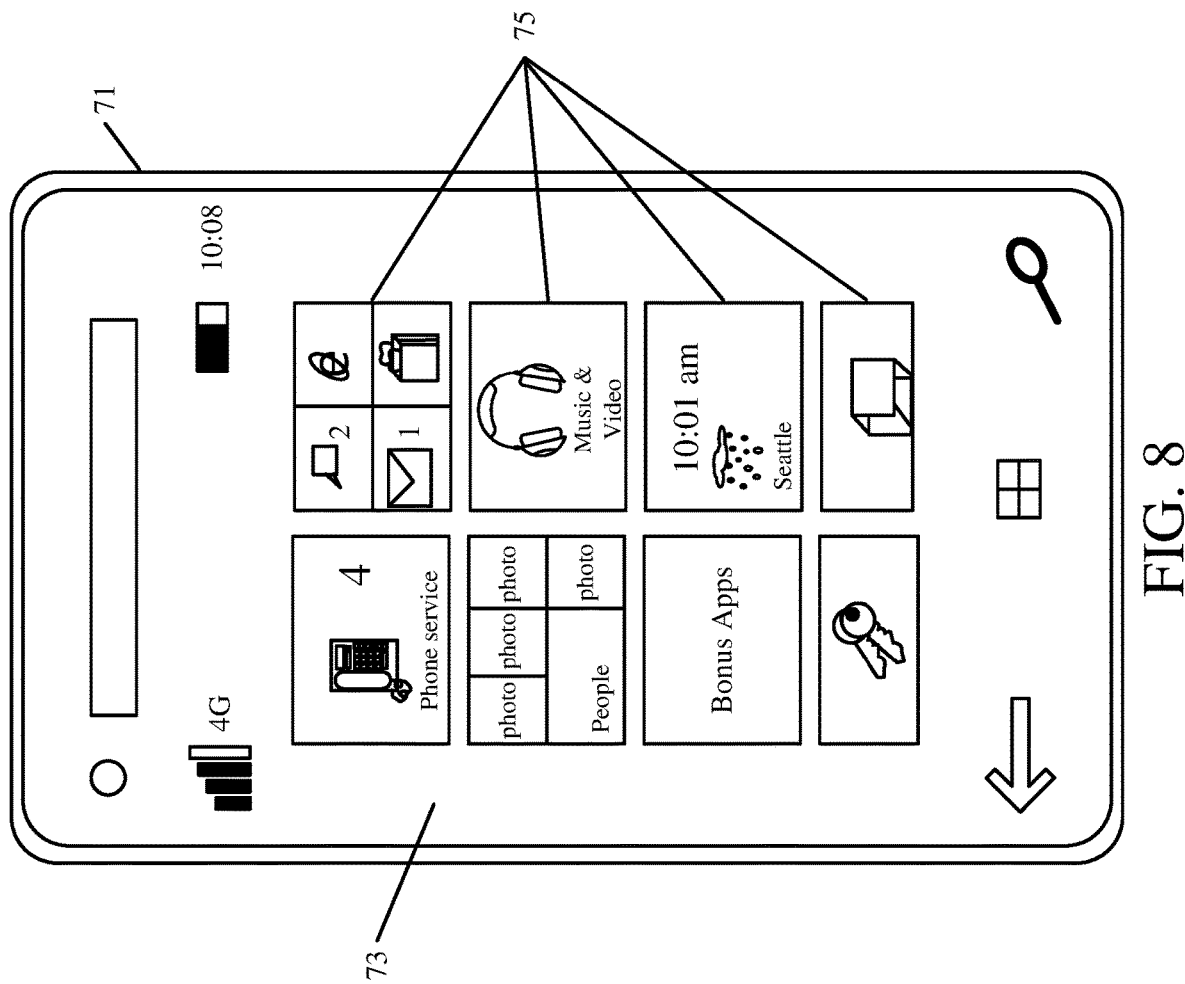

FIG. 6 is a simplified block diagram of one illustrative example of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components computing system 102 or user device 112, 114, 138 or system 116 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. System 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one example in which device 16 is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. Computer 600 can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
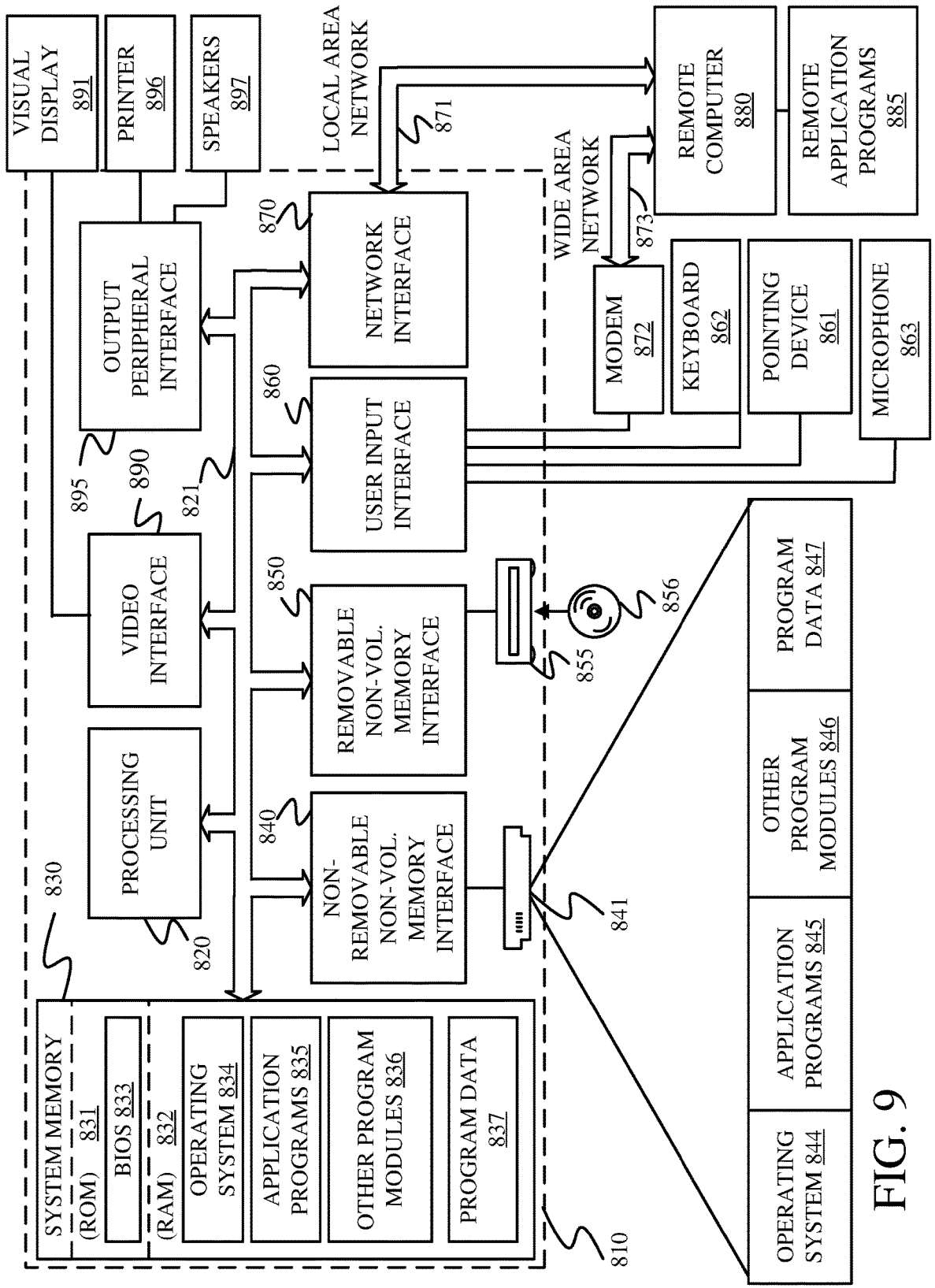
FIG. 9 shows an example of a computing system environment.

FIG. 9 is one example of a computing environment in which architecture 100, or parts of it, (for example) can be deployed. With reference to FIG. 9, an example system for implementing some embodiments includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer

810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:
one or more processors;
a connectivity data detection system, implemented by the one or more processors, that accesses a data access record that includes a data access request of a user device to access a hosted application, hosted by a host computing system, over a network and to detect a non-personal network attribute in the data access record;
a classification system, implemented by the one or more processors, that classifies a user of the user device as being an onsite user that used a physical machine located at an organization to connect the user device to the host computing system to access the hosted application over the network or a remote user of the user device that used a physical machine located at a location other than the organization to connect the user device to the host computing system to access the hosted application over the network;
a connectivity analysis system that generates connectivity performance information indicative of a performance of the user device in connecting with the host computing system over the network; and
an output generator that generates a control signal to surface the performance information through an administrative system.

Example 2 is the computing system of any or all previous examples wherein the connectivity data detection system comprises:
a source internet protocol (IP) address detector configured to detect a source IP address corresponding to the data access request and obfuscated to a degree of anonymity and to identify a set of data access requests received from the source IP address over a time period.

Example 3 is the computing system of any or all previous examples wherein the classification system comprises:
a user counter configured to count a number of different users corresponding to the identified set of data access requests over the time period to obtain a user cardinality corresponding to the source IP address;
a customer counter configured to count a number of different customers corresponding to the identified set of data access requests over the time period to obtain a customer cardinality corresponding to the source IP address; and
a customer/user cardinality classifier system configured to classify the user as being an onsite user or a remote user based on the user cardinality and the customer cardinality.

Example 4 is the computing system of any or all previous examples wherein the customer/user cardinality classifier system comprises:
a threshold comparison system configured to compare the user cardinality and the customer cardinality to a classification threshold to generate a comparison result; and
a classification system configured to classify the user as being an onsite user or a remote user based on the comparison result.

Example 5 is the computing system of any or all previous examples wherein the connectivity data detection system comprises:
an address resolution protocol (ARP) cache cardinality detector configured to identify a default gateway corresponding to the data access request and detect a cardinality of a cache used by the default gateway wherein the classification system comprises an ARP cache classifier system configured to compare the cardinality of the ARP cache to a classification threshold to obtain a comparison result and classify the user with the ARP cache classifier based on the comparison result.

Example 6 is the computing system of any or all previous examples wherein the connectivity data detection system comprises:
a local area network (LAN) subnetwork IP address detector configured to identify a LAN subnetwork IP address corresponding to the data access request; and
a domain name service server IP address detector configured to identify the IP address of a domain name service (DNS) server corresponding to the data access request and wherein the classification system comprises a LAN/DNS classifier system configured to compare the LAN subnet IP address to a list of LAN subnet IP addresses corresponding to a known classification of addresses, to determine whether the DNS server IP address is a public IP address or is the same as an IP address of a default gateway corresponding to the data access request to obtain a comparison result, and to classify the user with the LAN/DNS classifier system based on the comparison result.

Example 7 is the computing system of any or all previous examples wherein the connectivity data detection system comprises:
a virtual private network (VPN) detector configured to detect a presence or absence of a virtual private network (VPN) on the data access request, and wherein the classification system comprises a VPN classifier system configured to classify the user based on the presence or absence of the VPN.

Example 8 is a computer implemented method, comprising:
accessing a data access record in a log that includes a data access request of a user device to access a hosted application, hosted by a host computing system, over a network;
detecting, with a connectivity data collection system, a non-personal network attribute in the data access record;
controlling a classification system to classify a user of the user device as being an onsite user that used a physical machine located at an organization to connect the user device to the host computing system to access the hosted application over the network or a remote user of the user device that used a physical machine located at a location other than the organization to connect the user device to the host computing system to access the hosted application over the network;

generating connectivity performance information indicative of a performance of the user device in connecting with the host computing system over the network; and generating a control signal to surface the performance information through an administrative system.

Example 9 is the computer implemented method of any or all previous examples wherein detecting a non-personal network attribute comprises:

detecting a source internet protocol (IP) address corresponding to the data access request and obfuscated to a degree of anonymity; and identifying a set of data access requests received from the source IP address over a time period.

Example 10 is the computer implemented method of any or all previous examples wherein detecting a non-personal network attribute comprises:

counting a number of different users corresponding to the identified set of data access requests over the time period to obtain a user cardinality corresponding to the source IP address; and counting a number of different customers corresponding to the identified set of data access requests over the time period to obtain a customer cardinality corresponding to the source IP address, and wherein controlling a classification system comprises invoking a customer/user cardinality classifier system to classify the user as being an onsite user or a remote user based on the user cardinality and the customer cardinality.

Example 11 is the computer implemented method of any or all previous examples wherein controlling the classification system to classify the user as being an onsite user or a remote user based on the user cardinality and the customer cardinality comprises:

comparing the user cardinality and the customer cardinality to a classification threshold to generate a comparison result; and invoking a customer/user cardinality classifier system to classify the user as being an onsite user or a remote user based on the comparison result.

Example 12 is the computer implemented method of any or all previous examples wherein detecting a non-personal network attribute comprises:

identifying a default gateway corresponding to the data access request; and identifying a cardinality of an address resolution protocol (ARP) cache used by the default gateway.

Example 13 is the computer implemented method of any or all previous examples wherein controlling a classification system comprises:

invoking an ARP cache classifier system to classify the user as being an onsite user or a remote user based on the cardinality of the ARP cache used by the default gateway.

Example 14 is the computer implemented method of any or all previous examples wherein invoking an ARP cache classifier system comprises:

comparing the cardinality of the ARP cache to a classification threshold to obtain a comparison result; and classifying the user with the ARP cache classifier based on the comparison result.

Example 15 is the computer implemented method of any or all previous examples wherein detecting a non-personal network attribute comprises:

identifying a local area network (LAN) subnetwork IP address corresponding to the data access request;

identifying the IP address of a domain name service (DNS) server corresponding to the data access request and wherein controlling a classification system comprises invoking a LAN/DNS classifier system to classify the user based on the LAN subnet IP address and the DNS IP address.

Example 16 is the computer implemented method of any or all previous examples wherein invoking a LAN/DNS classifier system to classify the user based on the LAN subnet IP address and the DNS IP address comprises:

comparing the LAN subnet IP address to a list of LAN subnet IP addresses corresponding to a known classification of addresses;

determining whether the DNS server IP address is a public IP address or is the same as an IP address of a default gateway corresponding to the data access request to obtain a comparison result; and classifying the user with the LAN/DNS classifier system based on the comparison result.

Example 17 is the computer implemented method of any or all previous examples wherein detecting a non-personal network attribute comprises detecting a presence or absence of a virtual private network (VPN) on the data access request, and wherein controlling a classification system comprises:

invoking a VPN classifier system to classify the user based on the presence or absence of the VPN.

Example 18 is the computer implemented method of any or all previous examples wherein detecting a non-personal network attribute comprises identifying an owner of an autonomous system number (ASN) corresponding to the source IP address and wherein controlling a classification system comprises:

invoking an ASN classifier system to classify the user based on the owner of the ASN.

Example 19 is a computer system, comprising:

one or more processors; and memory storing computer executable instructions which, when executed by the one or more processors, cause the one or more processors to perform steps comprising:

accessing a data access record in a log that includes a data access request of a user device to access a hosted application, hosted by a host computing system, over a network;

detecting, with a connectivity data collection system, a non-personal network attribute in the data access record;

invoking a classification system to classify a user of the user device as being a first type of user that used a physical machine located at an organization to connect the user device to the host computing system to access the hosted application over the network or a second type of user of the user device that used a physical machine located at a location other than the organization to connect the user device to the host computing system to access the hosted application over the network;

generating connectivity information indicative of operation characteristics of the user device in connecting with the host computing system over the network; and generating a control signal to surface the operation characteristics through an administrative system.

Example 20 is the computer system of any or all previous examples wherein detecting a non-personal network attribute comprises:

detecting a source internet protocol (IP) address corresponding to the data access request obfuscated to a predefined degree of anonymity and wherein invoking a classification system comprises classifying the user as being an onsite user or a remote user based on the obfuscated source IP address.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
one or more processors; and
memory storing instructions executable by the one or more processors, wherein the instructions, when executed, cause the computing system to:
  access a data access record that includes a data access request of a user device to access a hosted application, hosted by a host computing system, over a network;
  detect a non-personal network attribute in the data access record, the non-personal network attribute comprising a source internet protocol (IP) address corresponding to the data access request and obfuscated to a degree of anonymity;
  identify a set of data access requests received from the source IP address over a time period;
  count a number of different users corresponding to the identified set of data access requests over the time period to obtain a user cardinality corresponding to the source IP address;
  count a number of different customers corresponding to the identified set of data access requests over the time period to obtain a customer cardinality corresponding to the source IP address;
  classify, based on the user cardinality and the customer cardinality, a user of the user device as being
    an onsite user that used a physical machine located at an organization to connect the user device to the host computing system to access the hosted application over the network, or
    a remote user of the user device that used a physical machine located at a location other than the organization to connect the user device to the host computing system to access the hosted application over the network;
  generate connectivity performance information based on the classification, the connectivity performance information being indicative of a performance of the user device in connecting with the host computing system over the network; and
  generate a control signal to surface the connectivity performance information through an administrative system.

2. The computing system of claim 1 wherein the connectivity performance information includes an indication of a configuration recommendation.

3. The computing system of claim 2 wherein the instructions, when executed, cause the computing system to:
  compare the user cardinality and the customer cardinality to a classification threshold to generate a comparison result; and
  classify the user as being an onsite user or a remote user based on the comparison result.

4. The computing system of claim 2 wherein the instructions, when executed, cause the computing system to:
  identify a default gateway corresponding to the data access request;
  detect a cardinality of an address resolution protocol (ARP) cache used by the default gateway;
  compare the cardinality of the ARP cache to a classification threshold to obtain a comparison result; and
  classify the user with an ARP cache classifier based on the comparison result.

5. The computing system of claim 2 wherein the instructions, when executed, cause the computing system to:
  identify a local area network (LAN) subnetwork IP address corresponding to the data access request; and
  identify an IP address of a domain name service (DNS) server corresponding to the data access request;
  based on a comparison of the LAN subnetwork IP address to a list of LAN subnetwork IP addresses corresponding to a known classification of addresses, determine whether the IP address of the DNS is a public IP address or is the same as an IP address of a default gateway corresponding to the data access request to obtain a comparison result; and
  classify the user with a LAN/DNS classifier system based on the comparison result.

6. The computing system of claim 2 wherein the instructions, when executed, cause the computing system to:
  detect a presence or absence of a virtual private network (VPN) on the data access request; and
  classify the user based on the presence or absence of the VPN.

7. A computer implemented method, comprising:
  accessing a data access record that includes a data access request of a user device to access a hosted application, hosted by a host computing system, over a network;
  detecting, with a connectivity data collection system, a non-personal network attribute in the data access record, wherein detecting a non-personal network attribute comprises:
    identifying a local area network (LAN) subnetwork internet protocol (IP) address corresponding to the data access request; and
    identifying an IP address of a domain name service (DNS) server corresponding to the data access request;
  invoking a LAN/DNS classifier system to classify, based on the LAN subnetwork IP address and the IP address of the DNS, a user of the user device as being an onsite user that used a physical machine located at an organization to connect the user device to the host computing system to access the hosted application over the network or a remote user of the user device that used a physical machine located at a location other than the organization to connect the user device to the host computing system to access the hosted application over the network;
  generating connectivity performance information indicative of a performance of the user device in connecting with the host computing system over the network; and
  generating a control signal to surface the connectivity performance information through an administrative system.

8. The computer implemented method of claim 7 wherein detecting a non-personal network attribute comprises:
  detecting a source internet protocol (IP) address corresponding to the data access request and obfuscated to a degree of anonymity; and
  identifying a set of data access requests received from the source IP address over a time period.

9. The computer implemented method of claim 8 wherein detecting a non-personal network attribute comprises:

counting a number of different users corresponding to the identified set of data access requests over the time period to obtain a user cardinality corresponding to the source IP address; and counting a number of different customers corresponding to the identified set of data access requests over the time period to obtain a customer cardinality corresponding to the source IP address, and wherein controlling a classification system comprises invoking a customer/user cardinality classifier system to classify the user as being an onsite user or a remote user based on the user cardinality and the customer cardinality.

10. The computer implemented method of claim 9 wherein controlling the classification system to classify the user as being an onsite user or a remote user based on the user cardinality and the customer cardinality comprises:

comparing the user cardinality and the customer cardinality to a classification threshold to generate a comparison result; and invoking a customer/user cardinality classifier system to classify the user as being an onsite user or a remote user based on the comparison result.

11. The computer implemented method of claim 10 wherein detecting a non-personal network attribute comprises:

identifying a default gateway corresponding to the data access request; and identifying a cardinality of an address resolution protocol (ARP) cache used by the default gateway.

12. The computer implemented method of claim 11 and further comprising:

invoking an ARP cache classifier system to classify the user as being an onsite user or a remote user based on the cardinality of the ARP cache used by the default gateway.

13. The computer implemented method of claim 12 wherein invoking an ARP cache classifier system comprises:

comparing the cardinality of the ARP cache to a classification threshold to obtain a comparison result; and classifying the user with the ARP cache classifier based on the comparison result.

14. The computer implemented method of claim 8 wherein detecting a non-personal network attribute comprises detecting a presence or absence of a virtual private network (VPN) on the data access request, and further comprising:

invoking a VPN classifier system to classify the user based on the presence or absence of the VPN.

15. The computer implemented method of claim 8 wherein detecting a non-personal network attribute comprises identifying an owner of an autonomous system number (ASN) corresponding to the source IP address and further comprising:

invoking an ASN classifier system to classify the user based on the owner of the ASN.

16. The computer implemented method of claim 7 wherein invoking a LAN/DNS classifier system to classify the user based on the LAN subnetwork IP address and the IP address of the DNS comprises:

comparing the LAN subnetwork IP address to a list of LAN subnetwork IP addresses corresponding to a known classification of addresses;

determining whether the IP address of the DNS is a public IP address or is the same as an IP address of a default gateway corresponding to the data access request to obtain a comparison result; and classifying the user with the LAN/DNS classifier system based on the comparison result.

17. A computer implemented method, comprising:

accessing a data access record that includes a data access request of a user device to access a hosted application, hosted by a host computing system, over a network;

detecting, with a connectivity data collection system, a non-personal network attribute in the data access record, wherein detecting a non-personal network attribute comprises:

detecting a source internet protocol (IP) address corresponding to the data access request and obfuscated to a degree of anonymity; and identifying an owner of an autonomous system number (ASN) corresponding to the source IP address;

invoking an ASN classifier system to classify, based on the owner of the ASN, a user of the user device as being an onsite user that used a physical machine located at an organization to connect the user device to the host computing system to access the hosted application over the network or a remote user of the user device that used a physical machine located at a location other than the organization to connect the user device to the host computing system to access the hosted application over the network;

generating connectivity performance information indicative of a performance of the user device in connecting with the host computing system over the network; and generating a control signal to surface the connectivity performance information through an administrative system.

18. A computing system comprising:

one or more processors; and memory storing instructions executable by the one or more processors, wherein the instructions, when executed, cause the computing system to:

access a data access record that includes a data access request of a user device to access a hosted application, hosted by a host computing system, over a network;

detect a non-personal network attribute comprising a source internet protocol (IP) address corresponding to the data access request and obfuscated to a degree of anonymity;

detect a presence or absence of a virtual private network (VPN) on the data access request;

classify, based on the presence or absence of the VPN, a user of the user device as being an onsite user that used a physical machine located at an organization to connect the user device to the host computing system to access the hosted application over the network, or a remote user of the user device that used a physical machine located at a location other than the organization to connect the user device to the host computing system to access the hosted application over the network;

generate connectivity performance information indicative of a performance of the user device in connecting with the host computing system over the network; and generate a control signal to surface the connectivity performance information through an administrative system.

19. A computing system comprising:

one or more processors; and memory storing instructions executable by the one or more processors, wherein the instructions, when executed, cause the computing system to:

access a data access record that includes a data access request of a user device to access a hosted application, hosted by a host computing system, over a network;

detect a non-personal network attribute comprising a source internet protocol (IP) address corresponding to the data access request and obfuscated to a degree of anonymity;

identify a default gateway corresponding to the data access request;

detect a cardinality of an address resolution protocol (ARP) cache used by the default gateway;

compare the cardinality of the ARP cache to a classification threshold to obtain a comparison result;

classify, with an ARP cache classifier based on the comparison result, a user of the user device as being an onsite user that used a physical machine located at an organization to connect the user device to the host computing system to access the hosted application over the network, or a remote user of the user device that used a physical machine located at a location other than the organization to connect the user device to the host computing system to access the hosted application over the network;

generate connectivity performance information indicative of a performance of the user device in connecting with the host computing system over the network; and generate a control signal to surface the connectivity performance information through an administrative system.

* * * * *